US012774628B2

(12) United States Patent
Robertson et al.

(10) Patent No.: US 12,774,628 B2
(45) Date of Patent: Oct. 27, 2026

(54) MOVEABLE PANEL WEDGE SYSTEM

(71) Applicant: Ford Global Technologies, LLC, Dearborn, MI (US)

(72) Inventors: Michael Robertson, West Bloomfield, MI (US); Venkatesh Krishnan, Canton, MI (US); Tyler D. Hamilton, Farmington, MI (US); Segundo Baldovino, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 551 days.

(21) Appl. No.: 18/208,019

(22) Filed: Jun. 9, 2023

(65) Prior Publication Data

US 2024/0410215 A1 Dec. 12, 2024

(51) Int. Cl.
*E05F 7/00* (2006.01)

(52) U.S. Cl.
CPC .................................... *E05F 7/005* (2013.01)

(58) Field of Classification Search
None
See application file for complete search history.

(56) References Cited

U.S. PATENT DOCUMENTS

| | | | | | |
|---|---|---|---|---|---|
| 5,626,384 | A * | 5/1997 | Walther | E05F 7/04 296/146.1 |
| 5,791,723 | A * | 8/1998 | Bell | B60J 5/06 16/86 B |
| 6,206,455 | B1 * | 3/2001 | Faubert | B60J 5/06 16/86 B |
| 8,628,141 | B1 * | 1/2014 | Thorpe | B62D 25/12 248/548 |
| 9,670,710 | B2 | 6/2017 | Kwak et al. | |
| 10,253,542 | B2 | 4/2019 | Nam et al. | |
| 10,450,785 | B2 * | 10/2019 | Osti | E05B 77/38 |
| 10,822,832 | B2 * | 11/2020 | Westgarth | E05F 5/06 |
| 2019/0055769 | A1 | 2/2019 | Davis | |
| 2022/0333421 | A1 | 10/2022 | Kwak et al. | |

FOREIGN PATENT DOCUMENTS

| | | | |
|---|---|---|---|
| FR | 3061677 | * | 7/2018 |
| KR | 20180116691 A | | 10/2018 |

* cited by examiner

*Primary Examiner* — Joseph D. Pape
(74) *Attorney, Agent, or Firm* — Vichit Chea; Carlson, Gaskey & Olds, P.C.

(57) ABSTRACT

A wedge system includes a receiver and a wedge that is received within the receiver when a moveable vehicle panel is in a closed position. The wedge stabilizes movement of the moveable vehicle panel along a first axis, along a second axis that is different than the first axis, and along a third axis that is different than the first axis and the second axis.

20 Claims, 5 Drawing Sheets

MOVEABLE PANEL WEDGE SYSTEM

TECHNICAL FIELD

This disclosure relates generally to a wedge system that stabilizes a movable panel in multiple directions.

BACKGROUND

Vehicles include various types of moveable panels such as lift panels, tailgates, doors, trunks, frunks, etc. Sensors can be mounted to these panels. The panels are subject to open/close cycles which may generate vibrations.

SUMMARY

In some aspects, the techniques described herein relate to wedge system, including: a receiver; and a wedge that is received within the receiver when a moveable vehicle panel is in a closed position, and wherein the wedge stabilizes movement of the moveable vehicle panel along a first axis, along a second axis that is different than the first axis, and along a third axis that is different than the first axis and the second axis.

In some aspects, the techniques described herein relate to a wedge system, wherein the wedge includes a first wedge interface that engages a first sloped surface on the receiver to stabilize the moveable vehicle panel from shifting back and forth along the first axis.

In some aspects, the techniques described herein relate to a wedge system, wherein the wedge includes a second wedge interface that engages a second sloped surface on the receiver to stabilize the moveable vehicle panel from shifting back and forth along the second axis.

In some aspects, the techniques described herein relate to a wedge system, wherein the wedge includes a distal end interface that engages a base surface of the receiver to stabilize the moveable vehicle panel from over-travelling along the third axis.

In some aspects, the techniques described herein relate to a wedge system, wherein the second wedge interface comprises opposing first and second wedge surfaces.

In some aspects, the techniques described herein relate to a wedge system, wherein the receiver comprises a base surface, first and second sloped surfaces extending away from opposing edges of the base surface, and a third sloped surface extending away from the base surface and connecting the first and second sloped surfaces to each other to form a pocket that is open at one end and closed at an opposite end by the base surface.

In some aspects, the techniques described herein relate to a wedge system, wherein the wedge comprises an elongated body extending from a first end to a second end, wherein the first end is at the one end of the receiver when in the closed position, and wherein the elongated body comprises: opposing first and second wedge surfaces that respectively engage the first and second sloped surfaces of the receiver when in the closed position; a third wedge surface that engages the third sloped surface of the receiver when in the closed position; and a distal end surface at the second end that engages the base surface of the receiver when in the closed position.

In some aspects, the techniques described herein relate to a wedge system, wherein the receiver includes an attachment interface that allows the receiver to self-align with the wedge during insertion.

In some aspects, the techniques described herein relate to wedge system, including: a vehicle structure; a panel moveable relative to the vehicle structure between an open position and a closed position; a receiver mounted to the vehicle structure; and a wedge mounted to the panel, wherein the wedge is received within the receiver when the panel is in the closed position, and wherein the wedge stabilizes movement of the panel along a first axis, along a second axis that is different than the first axis, and along a third axis that is different than the first axis and the second axis.

In some aspects, the techniques described herein relate to a wedge system that includes at least one sensor mounted to the panel.

In some aspects, the techniques described herein relate to a wedge system, wherein the receiver comprises a base surface, first and second sloped surfaces extending away from opposing edges of the base surface, and a third sloped surface extending away from the base surface and connecting the first and second sloped surfaces to each other to form a pocket that is open at a first end of the receiver and that is closed at a second end of the receiver by the base surface.

In some aspects, the techniques described herein relate to a wedge system, wherein the wedge comprises an elongated body extending from a first end to a second end that is inserted into the receiver when moving to the closed position, and wherein the elongated body comprises: opposing first and second wedge surfaces that respectively engage the first and second sloped surfaces of the receiver when in the closed position; a third wedge surface that engages the third sloped surface of the receiver when in the closed position; and a distal end surface at the second end that engages the base surface of the receiver when in the closed position.

In some aspects, the techniques described herein relate to a wedge system, wherein the elongated body includes a mounting flange at the first end that attaches to the panel.

In some aspects, the techniques described herein relate to a wedge system, wherein the receiver includes an attachment interface comprising at least a first fastener attachment at the first end of the receiver and a second fastener attachment at the second end of the receiver.

In some aspects, the techniques described herein relate to a wedge system, wherein the first fastener attachment comprises a fixed pivot point for a first fastener and the second fastener attachment comprises a slot to receive a second fastener.

In some aspects, the techniques described herein relate to a method including: mounting a wedge receiver to one of a fixed vehicle structure or a panel moveable relative to the fixed vehicle structure between an open position and a closed position; mounting a wedge to the other of the fixed vehicle structure or the panel; and inserting the wedge into the wedge receiver when moving the panel to the closed position to stabilize movement of the panel along a first axis, along a second axis that is different than the first axis, and along a third axis that is different than the first axis and the second axis.

In some aspects, the techniques described herein relate to a method that includes self-aligning the receiver with the wedge during insertion of the wedge into the receiver.

In some aspects, the techniques described herein relate to a method that includes attaching one end of the receiver to the fixed vehicle structure at a fixed pivot point and attaching an opposite end of the receiver to the fixed vehicle structure with a slotted interface, and further including: inserting a first fastener into an opening in the receiver at the fixed pivot point with a loose fit; inserting a second fastener into an elongated slot at the slotted interface with a loose fit; inserting the wedge into the wedge receiver causing the receiver to pivot and self-align via the fixed pivot point and slotted interface; and subsequently tightening the first fastener and the second fastener.

In some aspects, the techniques described herein relate to a method that includes providing the receiver with a base surface, first and second sloped surfaces that extend away from opposing edges of the base surface, and a third sloped surface that extends away from the base surface and connects the first and second sloped surfaces to each other to form a pocket that is open at a first end of the receiver and that is closed at a second end of the receiver by the base surface.

In some aspects, the techniques described herein relate to a method that includes providing the wedge with an elongated body that extends from a first end to a second end that is inserted into the receiver when moving to the closed position, and further including providing the elongated body with: opposing first and second wedge surfaces that respectively engage the first and second sloped surfaces of the receiver when in the closed position; a third wedge surface that engages the third sloped surface of the receiver when in the closed position; and a distal end surface at the second end that engages the base surface of the receiver when in the closed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a wedge system that stabilizes a movable panel in multiple directions. This system facilitates static/dynamic stability and positional alignment for proper function of sensors that are mounted to moveable panels for Advanced Driver Assistance Systems (ADAS), for example. The subject disclosure provides a locking wedge system that stabilizes the movable panel in side-to-side and fore/aft directions, as well as stabilizing the panel from over-traveling in a downward direction.

Figure 1:
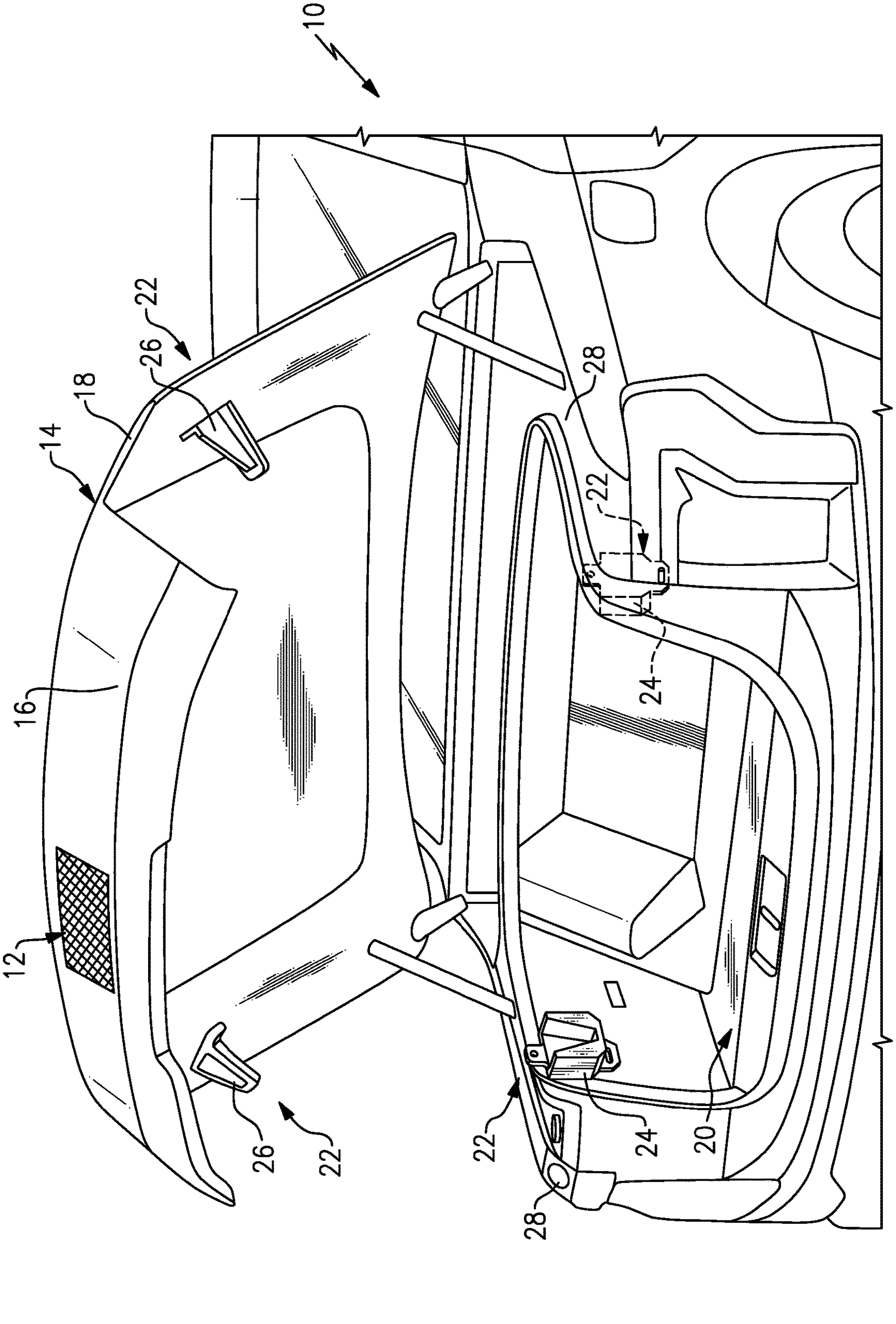
FIG. 1 illustrates a perspective view of a vehicle having a moveable panel and a wedge system according to an exemplary aspect of the present disclosure.

FIG. 1 illustrates a vehicle 10 with one or more sensors 12, such as cameras, Lidar, radar, sonar, etc., for example, that are incorporated around a vehicle perimeter. In the example, shown, one or more sensors 12 are mounted to a moveable panel 14 that comprises a frunk opening panel on an electrified vehicle. The moveable panel 14 could also be a lift panel, tailgate, door, or trunk panel. The moveable panel 14 is moveable between a closed position and an open position to allow access to passenger areas or cargo areas. In the example shown in FIG. 1, the sensor 12 is mounted to a grill 16 of the frunk panel 14, which is connected to a hood portion 18 of the frunk panel such that the grill 16 and hood portion 18 move as a unit when the frunk panel 14 is moved to the open position. This provides better access to a cargo area 20 that is enclosed by the frunk panel 14.

The sensors are subject to various vibration load inputs as the vehicle is driven over different types of terrain. Additionally, the sensors 12 are subjected to vibration load inputs as the moveable panel 14 is cycled through opening and closing events. Certain sensors 12, such as Lidar sensors for example, require higher levels of static and dynamic stability, as well as specific positional alignment for proper function of the ADAS system. For example, a Lidar sensor may have limits of only 5 mm and 2 degrees of offset from a nominal set design position. In order to maintain these stringent positional requirements, the subject disclosure provides for a wedge system 22 that can stabilize movement of the panel 14 in multiple directions. In one example, the wedge system 22 stabilizes movement of the panel 14 along at least three different axes.

In one example, the wedge system 22 includes a receiver 24 mounted to a vehicle structure 28 and a wedge 26 mounted to the panel 14. Optionally, the positions could be reversed. In one example, the vehicle structure 28 comprises a stationary side panel that extends alongside an edge of a frunk compartment. As shown in FIG. 1, each side of the frunk compartment includes at least one wedge system 22. Additional wedge systems could be included as needed depending on the side The wedges 26 are received within the receivers 24 when the panel 14 is in the closed position.

In one example, the receiver 24 is made from a rigid molded plastic or cast steel material, and the wedge 26 is made from a softer, more resilient material than the receiver 24. For example, the wedge 26 could be made from dense rubber or other similar material. In one example, the wedge 26 should have rigidity that is less than a rigidity of the receiver 24. Said another way, in one example, the wedge 26 should be more resilient than the receiver 24. This allows a slight compression of the wedge 26 in multiple directions as the wedge 26 is inserted into the receiver 24 to further enhance the wedging effect.

Figure 3:
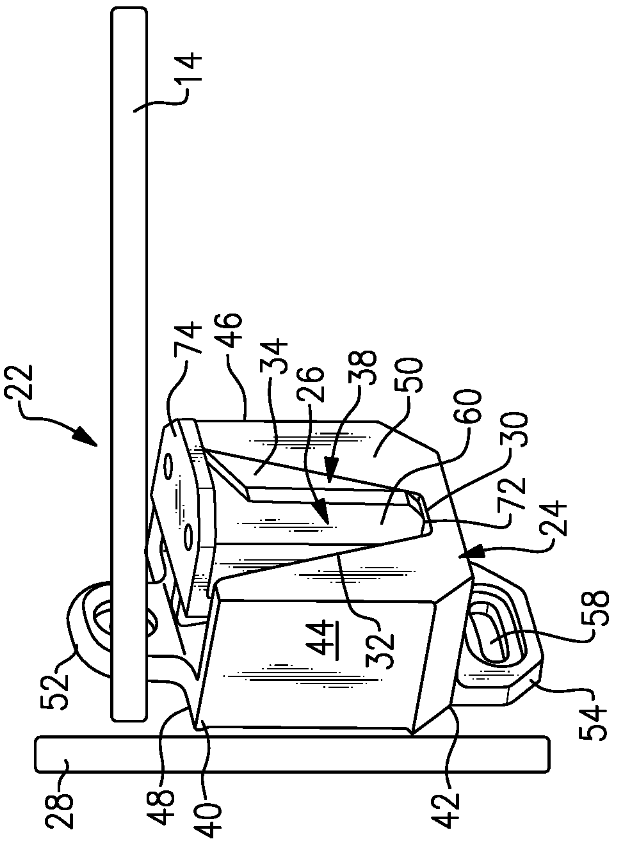
FIG. 3 is an assembled perspective view of the wedge system of FIG. 2.
Figure 2:
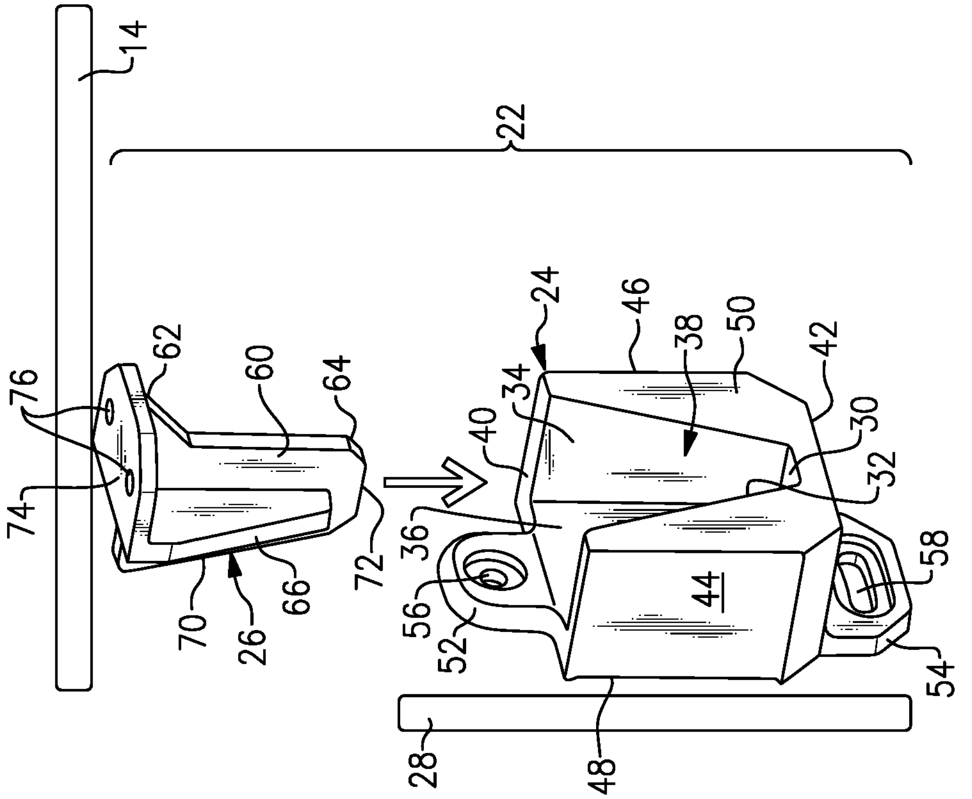
FIG. 2 illustrates an exploded view of the wedge system of FIG. 1.

FIGS. 2-3 show the wedge system 22 in greater detail. In one example, the receiver 24 comprises a base surface 30, first 32 and second 34 sloped surfaces extending away from opposing edges of the base surface 30, and a third sloped surface 36 extending away from the base surface 30 and connecting the first 32 and second 34 sloped surfaces to each other to form a pocket 38 that is open at a first end 40 of the receiver 24 and that is closed at a second end 42 of the receiver 24 by the base surface 30. In one example, the sloped surfaces 32, 34, 36 can comprise tapered surfaces or angled surfaces that are at a specific angle relative to a vertical axis. In one example, the pocket 38 comprises a V-shaped pocket that is enclosed on three sides by a first side wall 44, a second side wall 46, and a rear wall 48 that connects the first side wall 44 to the second side wall 46. In one example, the pocket 38 is open on a fourth side at a front wall 50 such that the wedge 26 is able to at least partially extend outward of an end face of the front wall 50 when the wedge 26 is inserted within the receiver 24 as shown in FIG. 3.

In one example, the receiver 24 includes an attachment interface comprising at least a first fastener attachment 52 at the first end 40 of the receiver 24 and a second fastener attachment 54 at the second end 42 of the receiver 24. In one example, the first fastener attachment 52 comprises a fixed pivot point at a first fastener opening 56 and the second fastener attachment 54 comprises a slotted interface with an elongated slot 58 that provide a self-alignment features. This will be discussed in greater detail below.

In one example, the wedge 26 comprises an elongated body 60 extending from a first end 62 to a second end 64 that is inserted into the receiver 24 when the panel 14 is moved to the closed position. In one example, the elongated body 60 includes opposing first 66 and second 68 (FIG. 5A) wedge surfaces, a third wedge surface 70, and a distal end surface 72 at the second end 64. In one example, the first 66 and second 68 (FIG. 5A) wedge surfaces comprise sloped, tapered, or angled surfaces that respectively engage the first 32 and second 34 sloped surfaces of the receiver 24 when in the closed position. In one example, the third wedge surface 70 comprises a sloped, tapered, or angled surface that engages the third sloped surface 36 of the receiver 24 when in the closed position. In one example, the distal end surface 72 engages the base surface 30 of the receiver 24 when in the closed position.

In one example, the base surface 30 comprises a flat surface 30 with the first 32 and second 34 sloped surfaces tapering in a vertical direction, upwardly and away from the base surface 30, such that a distance between the first 32 and second 34 sloped surfaces is greater at the first end 40 than at the second end 42. In one example, the opposing first 66 and second 68 wedge surfaces of the wedge 26 taper in a vertical direction, upwardly and away from opposing sides of the elongated body 60, such that a distance between the opposing first 66 and second 68 wedge surfaces is greater at the first end 62 of the wedge 26 than at the second end 64.

In one example, the elongated body 60 includes a mounting flange 74 at the first end 62 of the wedge 26 that attaches to the panel 14. In one example, the mounting flange 74 comprises a flat, plate with one or more apertures 76 configured to receive fasteners 90 (FIG. 7) to secure the wedge 26 to the panel 14. Other types of attachment methods such as gluing, welding, etc. could also be used.

Figure 4A:
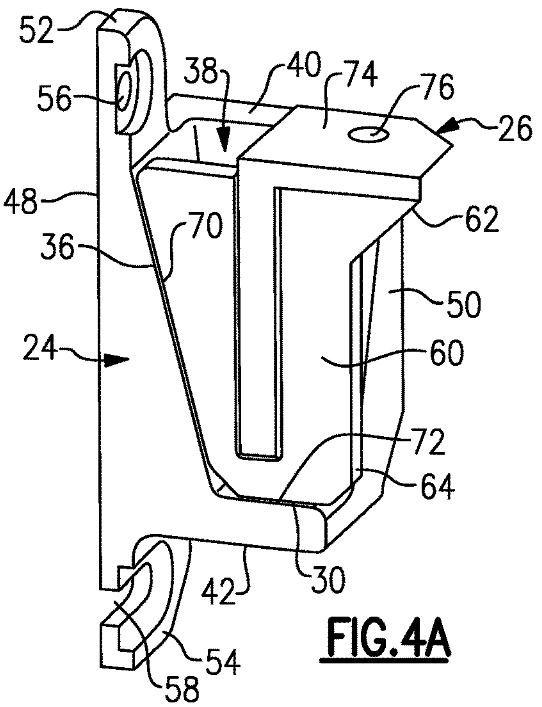
FIG. 4A is a side section view of the wedge system of FIG. 3.
Figure 4B:
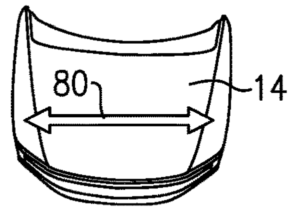
FIG. 4B is a schematic view indicating stabilizing movement direction for a moveable panel associated with a wedge feature as indicated in FIG. 4A.

FIGS. 4A-B and 5A-C show that the wedge 26 stabilizes movement of the panel along a first axis 80, along a second axis 82 that is different than the first axis 80, and along a third axis 84 that is different than the first axis 80 and the second axis 82. FIG. 4A shows a wedge interface where the third wedge surface 70 engages and interlocks with the third sloped surface 36 on the receiver 24 to stabilize the moveable vehicle panel 14 from shifting back and forth along the first axis 80 as shown in FIG. 4B. In one example, the first axis 80 extends in a lateral direction across a width of the vehicle 10.

Figure 5A:
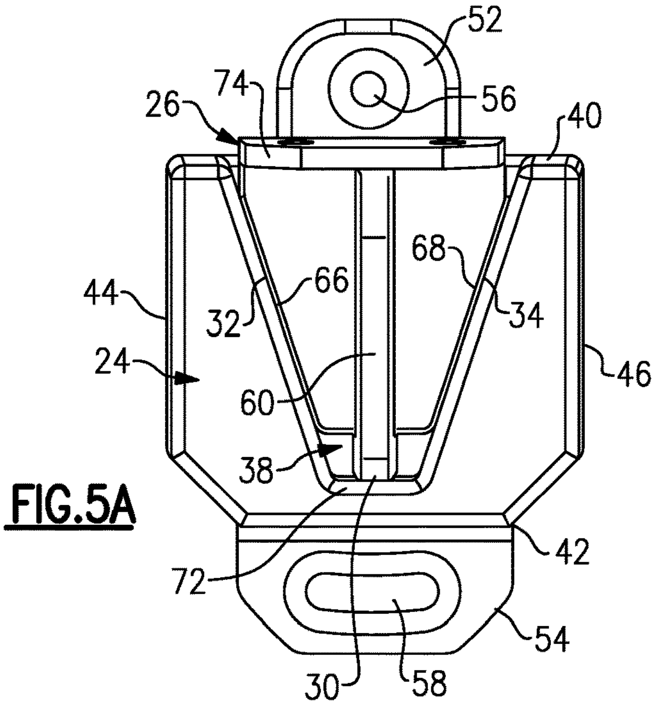
FIG. 5A is a front section view of the wedge system of FIG. 3.
Figure 5B:
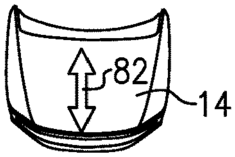
FIG. 5B is a schematic view indicating stabilizing movement direction for a moveable panel associated with a wedge feature as indicated in FIG. 5A.
Figure 5C:
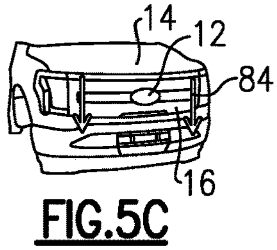
FIG. 5C is a schematic view indicating stabilizing movement direction for a moveable panel associated with a distal end feature as indicated in FIG. 5A.

FIG. 5A shows another wedge interface where the opposing first 66 and second 68 wedge surfaces of the wedge 26 engage and interlock with the first 32 and second 34 sloped surfaces on the receiver 24 to stabilize the moveable vehicle panel 14 from shifting back and forth along the second axis 82 as shown in FIG. 5B. In one example, the second axis 82 extends in a longitudinal direction along a length of the vehicle. FIG. 5A also shows the distal end 72 that engages the base surface 30 of the receiver 24 to stabilize the moveable vehicle panel 14 from over-travelling downward along the third axis 84 as shown in FIG. 5C. In one example, the third axis 84 extends in a vertical direction along a height of the vehicle.

In one example, the first axis 80 is perpendicular to the second axis 82, and the third axis 84 is perpendicular to the first axis 80 and the second axis 82.

In one example, a method includes mounting the wedge receiver 24 to the stationary side structure 28, mounting the wedge 26 to the panel 14, and inserting the wedge 26 into the wedge receiver 24 when moving the panel 14 to the closed position to stabilize movement of the panel 14 along the first axis 80, along the second axis 82, and along the third axis 84.

Figure 6C:
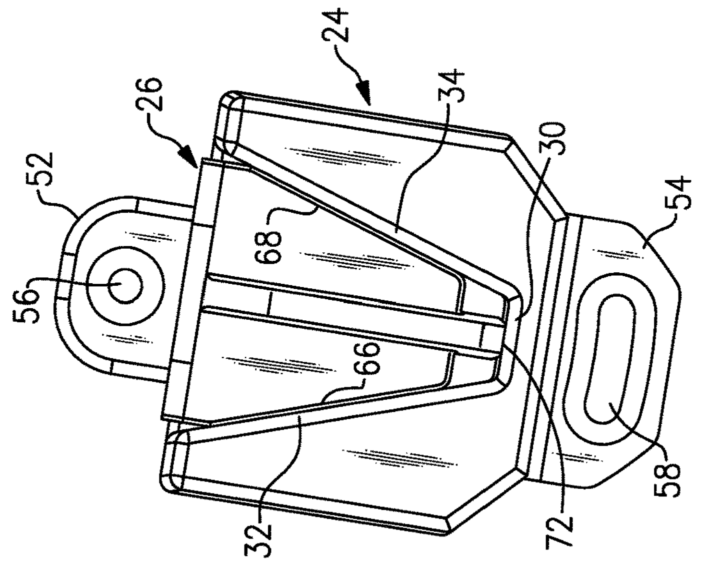
FIG. 6C is similar to FIG. 6B but shows the wedge fully inserted into the receiver.
Figure 6B:
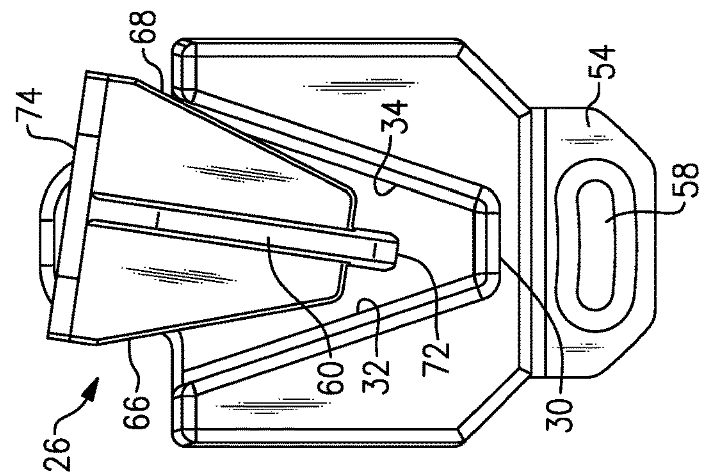
FIG. 6B is similar to FIG. 6A but shows the wedge being inserted into the receiver for self-alignment.
Figure 6A:
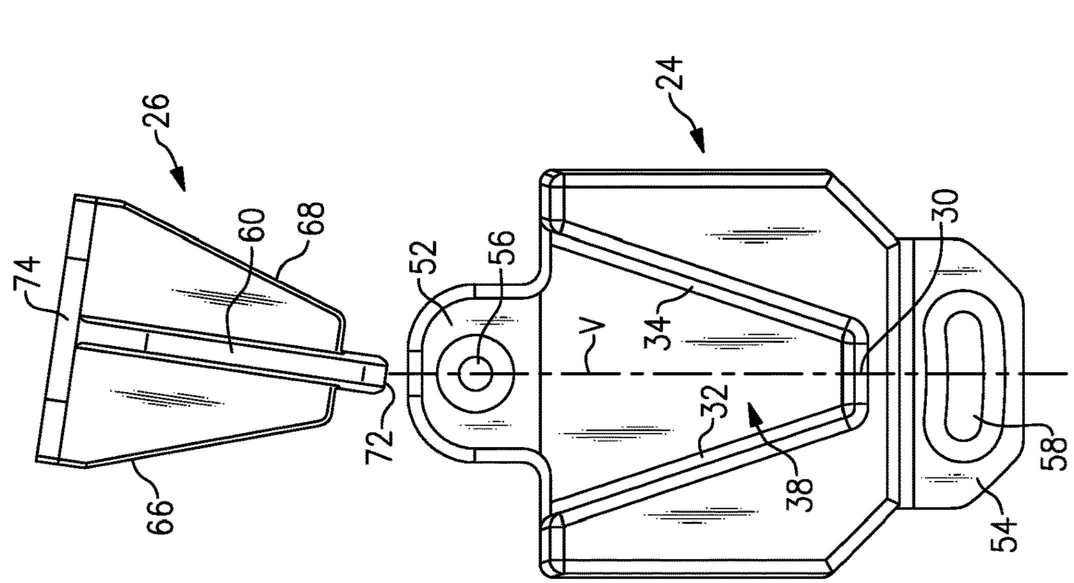
FIG. 6A is a front view of a receiver and wedge prior to insertion of the wedge into the receiver.
Figure 7:
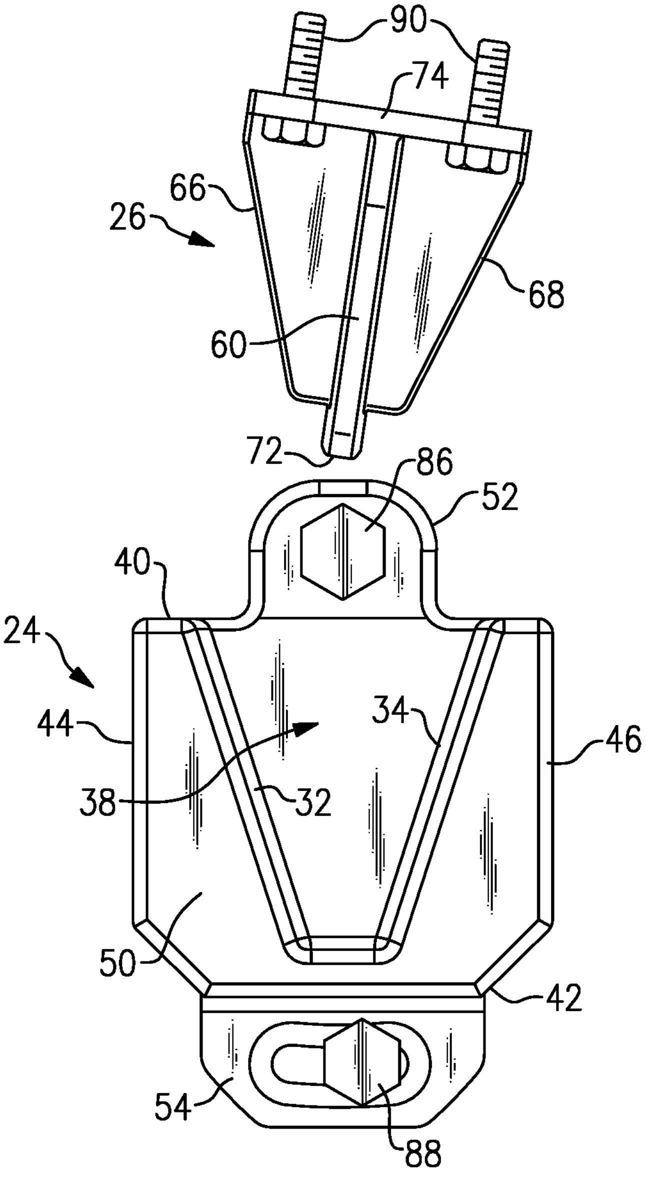
FIG. 7 shows an example attachment interface for the wedge and receiver of FIGS. 6A-6C.

In one example, an additional step includes self-aligning the receiver 24 with the wedge 26 during insertion of the wedge 26 into the receiver 24 as shown in FIGS. 6A-C. FIG. 6A shows the receiver 24 aligned along a vertical axis V and a wedge 26 that is slightly out of alignment with the vertical axis V. As discussed above, the receiver 24 has the first fastener attachment 52 that comprises a fixed pivot point for a first fastener 86 (FIG. 7) and the second fastener attachment 54 comprises an elongated slot 58 to receive a second fastener 88 (FIG. 7). The fixed pivot point and elongated slot allow the receiver 24 to pivot during insertion of the wedge 26 into the receiver (FIG. 6B) for self-alignment purposes. FIG. 6B shows the wedge 26 contacting the receiver 24 and rotating the receiver 24 to proper alignment. FIG. 6C shows an example of the wedge 26 fully installed within the receiver 24 in a slightly offset position relative to the vertical axis V to accommodate the offset wedge 26. This helps to accommodate for variations in installment positions for the wedge 26 and receiver 24. Additionally, the wedge system 22 helps with panel alignment, e.g. fit and finish along edges of the panel (FIGS. 4B and 5B), and reduces panel flutter while driving at higher speeds.

FIG. 7 shows one example method of a self-alignment procedure. In this example, the first fastener 86 is inserted into the first fastener opening 56 in the receiver 24 at the fixed pivot point with a loose fit. The second fastener 88 is inserted into the elongated slot 58 at the slotted interface with a loose fit. The fasteners 90 for the wedge 26 are inserted into openings (not shown) in the panel 14 in a loose fit. Next, the wedge 26 is inserted into the wedge receiver 24 causing the receiver to pivot and self-align via the fixed pivot point and slotted interface as shown in FIGS. 6A-C. Once the wedge 26 and receiver 24 are aligned, the fasteners 86, 88, 90 can be subsequently tightened. Optionally, the receiver 24 can be configured to allow pivoting about the fixed pivot point once fully installed.

The subject disclosure provides a wedge system for a moveable panel that provides added directions of stability for a moveable panel over existing lift panel configurations.

The wedge system utilizes a receiver that receives a wedge and stabilizes movement of the panel along at least three different axes. This pivoting receiving wedge design allows for panel-to-panel misalignment and better fit and finish control. There is also added stability for moveable panels that have sensors mounted to them.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A wedge system comprising:

a receiver;

a wedge that is received within the receiver when a moveable vehicle panel is in a closed position, and wherein the wedge stabilizes movement of the moveable vehicle panel along a lateral axis extending across a vehicle width, along a longitudinal axis extending along a vehicle length, and along a vertical axis extending along a vehicle height;

wherein the wedge comprises a mounting flange with an elongated body that extends generally perpendicularly from the mounting flange to a distal end, and wherein the wedge includes a first wedge interface that engages a first sloped surface on the receiver to stabilize the moveable vehicle panel from shifting back and forth along the lateral axis; and the wedge is insertable within the receiver along the vertical axis.

2. The wedge system according to claim 1, wherein the wedge includes a second wedge interface that engages a second sloped surface on the receiver to stabilize the moveable vehicle panel from shifting back and forth along the longitudinal axis.

3. The wedge system according to claim 2, wherein the wedge includes a distal end interface that engages a base surface of the receiver to stabilize the moveable vehicle panel from over-travelling along the vertical axis.

4. The wedge system according to claim 2, wherein the second wedge interface comprises opposing first and second wedge surfaces.

5. A wedge system comprising:

a receiver, wherein the receiver comprises a base surface, first and second sloped surfaces extending away from opposing edges of the base surface, and a third sloped surface extending away from the base surface and connecting the first and second sloped surfaces to each other to form a pocket that is open at one end and closed at an opposite end by the base surface;

a wedge that is received within the receiver when a moveable vehicle panel is in a closed position, and wherein the wedge stabilizes movement of the moveable vehicle panel along a lateral axis extending across a vehicle width, along a longitudinal axis extending along a vehicle length, and along a vertical axis extending along a vehicle height; and the wedge is insertable within the receiver along the vertical axis.

6. The wedge system according to claim 5, wherein the wedge comprises an elongated body extending from a first end to a second end, wherein the first end is at the one end of the receiver when in the closed position, and wherein the elongated body comprises:

opposing first and second wedge surfaces that respectively engage the first and second sloped surfaces of the receiver when in the closed position;

a third wedge surface that engages the third sloped surface of the receiver when in the closed position; and a distal end surface at the second end that engages the base surface of the receiver when in the closed position.

7. The wedge system according to claim 5, wherein the receiver includes an attachment interface that allows the receiver to self-align with the wedge during insertion.

8. A wedge system comprising:

a vehicle structure defining a lateral axis extending along a vehicle width, a longitudinal axis extending along a vehicle length, and a vertical axis extending along a vehicle height;

a panel moveable relative to the vehicle structure between an open position and a closed position;

a receiver mounted to the vehicle structure, wherein the receiver comprises a base surface, first and second sloped surfaces extending away from opposing edges of the base surface, and a third sloped surface extending away from the base surface and connecting the first and second sloped surfaces to each other to form a pocket that is open at a first end of the receiver and that is closed at a second end of the receiver by the base surface; and a wedge mounted to the panel, wherein the wedge is insertable along the vertical axis and is received within the receiver when the panel is in the closed position, and wherein the wedge stabilizes movement of the panel along the lateral axis, along the longitudinal axis, and along the vertical axis.

9. The wedge system according to claim 8, including at least one sensor mounted to the panel.

10. The wedge system according to claim 8, wherein the wedge comprises an elongated body extending from a first end to a second end that is inserted into the receiver when moving to the closed position, and wherein the elongated body comprises:

opposing first and second wedge surfaces that respectively engage the first and second sloped surfaces of the receiver when in the closed position;

a third wedge surface that engages the third sloped surface of the receiver when in the closed position; and a distal end surface at the second end that engages the base surface of the receiver when in the closed position.

11. The wedge system according to claim 10, wherein the elongated body includes a mounting flange at the first end that attaches to the panel, and wherein the elongated body extends generally perpendicularly from the mounting flange to a distal end.

12. A wedge system comprising:

a vehicle structure;

a panel moveable relative to the vehicle structure between an open position and a closed position;

a receiver mounted to the vehicle structure;

a wedge mounted to the panel, wherein the wedge is received within the receiver when the panel is in the closed position, and wherein the wedge stabilizes movement of the panel along a first axis, along a second axis that is different than the first axis, and along a third axis that is different than the first axis and the second axis;

wherein the receiver comprises a base surface, first and second sloped surfaces extending away from opposing edges of the base surface, and a third sloped surface extending away from the base surface and connecting the first and second sloped surfaces to each other to form a pocket that is open at a first end of the receiver and that is closed at a second end of the receiver by the base surface; and wherein the receiver includes an attachment interface comprising at least a first fastener attachment at the first end of the receiver and a second fastener attachment at the second end of the receiver.

13. The wedge system according to claim 12, wherein the first fastener attachment comprises a fixed pivot point for a first fastener and the second fastener attachment comprises a slot to receive a second fastener.

14. A method comprising:

providing a fixed vehicle structure defining a lateral axis extending along a vehicle width, a longitudinal axis extending along a vehicle length, and a vertical axis extending along a vehicle height;

mounting a wedge receiver to one of the fixed vehicle structure or a panel moveable relative to the fixed vehicle structure between an open position and a closed position;

forming a first attachment opening at one edge of the wedge receiver and forming a second attachment opening at an opposite edge of the wedge receiver. the second attachment opening comprising an elongated slot;

mounting a wedge to the other of the fixed vehicle structure or the panel; and inserting the wedge into the wedge receiver along the vertical axis when moving the panel to the closed position to stabilize movement of the panel along the lateral axis, along the longitudinal axis, and along the vertical axis.

15. The method according to claim 14, including self-aligning the wedge receiver with the wedge during insertion of the wedge into the wedge receiver.

16. A method comprising:

mounting a wedge receiver to one of a fixed vehicle structure or a panel moveable relative to the fixed vehicle structure between an open position and a closed position;

mounting a wedge to the other of the fixed vehicle structure or the panel;

attaching one end of the wedge receiver to the fixed vehicle structure at a fixed pivot point and attaching an opposite end of the wedge receiver to the fixed vehicle structure with a slotted interface, and further including:

inserting a first fastener into an opening in the wedge receiver at the fixed pivot point with a loose fit;

inserting a second fastener into an elongated slot at the slotted interface with a loose fit;

inserting the wedge into the wedge receiver causing the wedge receiver to pivot and self-align via the fixed pivot point and slotted interface; and subsequently tightening the first fastener and the second fastener; and inserting the wedge into the wedge receiver when moving the panel to the closed position to stabilize movement of the panel along a first axis, along a second axis that is different than the first axis, and along a third axis that is different than the first axis and the second axis.

17. A method comprising:

providing a fixed vehicle structure defining a lateral axis extending along a vehicle width, a longitudinal axis extending along a vehicle length, and a vertical axis extending along a vehicle height;

mounting a wedge receiver to one of the fixed vehicle structure or a panel moveable relative to the fixed vehicle structure between an open position and a closed position;

providing the wedge receiver with a base surface, first and second sloped surfaces that extend away from opposing edges of the base surface, and a third sloped surface that extends away from the base surface and connects the first and second sloped surfaces to each other to form a pocket that is open at a first end of the wedge receiver and that is closed at a second end of the wedge receiver by the base surface;

mounting a wedge to the other of the fixed vehicle structure or the panel; and inserting the wedge into the wedge receiver along the vertical axis when moving the panel to the closed position to stabilize movement of the panel along the lateral axis, along the longitudinal axis. and along the vertical axis.

18. The method according to claim 17, including providing the wedge with a mounting flange and an elongated body that extends generally perpendicularly to the mounting flange from a first end to a second end that is inserted into the wedge receiver when moving to the closed position, and further including providing the elongated body with:

opposing first and second wedge surfaces that respectively engage the first and second sloped surfaces of the wedge receiver when in the closed position;

a third wedge surface that engages the third sloped surface of the wedge receiver when in the closed position; and a distal end surface at the second end that engages the base surface of the wedge receiver when in the closed position.

19. A wedge system comprising:

a vehicle structure defining a lateral axis extending along a vehicle width. a longitudinal axis extending along a vehicle length. and a vertical axis extending along a vehicle height;

a panel moveable relative to the vehicle structure between an open position and a closed position;

a receiver mounted to the vehicle structure;

a first attachment opening at one edge of the receiver and a second attachment opening at an opposite edge of the receiver, the second attachment opening comprising an elongated slot; and a wedge mounted to the panel, wherein the wedge is insertable along the vertical axis and is received within the receiver when the panel is in the closed position, and wherein the wedge stabilizes movement of the panel along the lateral axis. along the longitudinal axis. and along the vertical axis.

20. A wedge system comprising:

a receiver:

a first attachment opening at one edge of the receiver and a second attachment opening at an opposite edge of the receiver, the second attachment opening comprising an elongated slot;

a wedge that is received within the receiver when a moveable vehicle panel is in a closed position, and wherein the wedge stabilizes movement of the moveable vehicle panel along a lateral axis extending across a vehicle width, along a longitudinal axis extending along a vehicle length, and along a vertical axis extending along a vehicle height; and the wedge is insertable within the receiver along the vertical axis.

* * * * *